INVENTOR.
WILLIAM KWO-WEI CHEN
BY William A. Drucker
ATTORNEY

March 26, 1968  WILLIAM KWO-WEI CHEN  3,375,182
ELECTRODIALYSIS METHOD AND APPARATUS HAVING
RADIALLY SYMMETRICAL FLOW PATHS
Original Filed March 30, 1962  6 Sheets-Sheet 2

FIG. 2

INVENTOR.
WILLIAM KWO-WEI CHEN
BY
William A. Drucker
ATTORNEY

FIG. 4
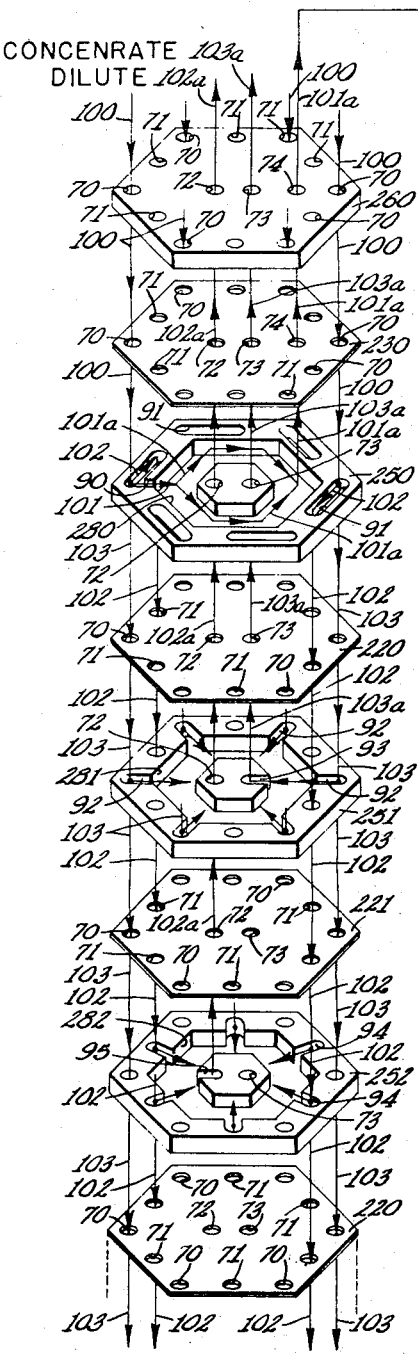
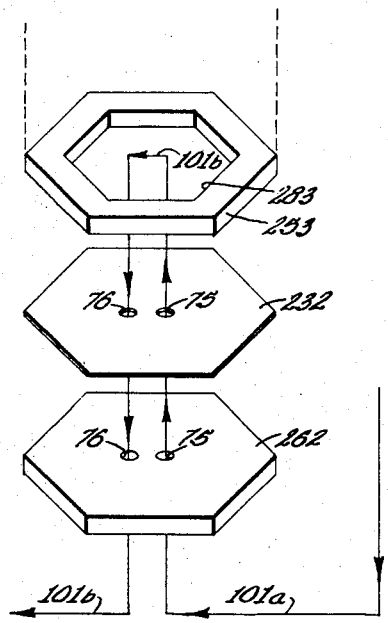

March 26, 1968 WILLIAM KWO-WEI CHEN 3,375,182
ELECTRODIALYSIS METHOD AND APPARATUS HAVING
RADIALLY SYMMETRICAL FLOW PATHS
Original Filed March 30, 1962 6 Sheets-Sheet 5
FIG. 5
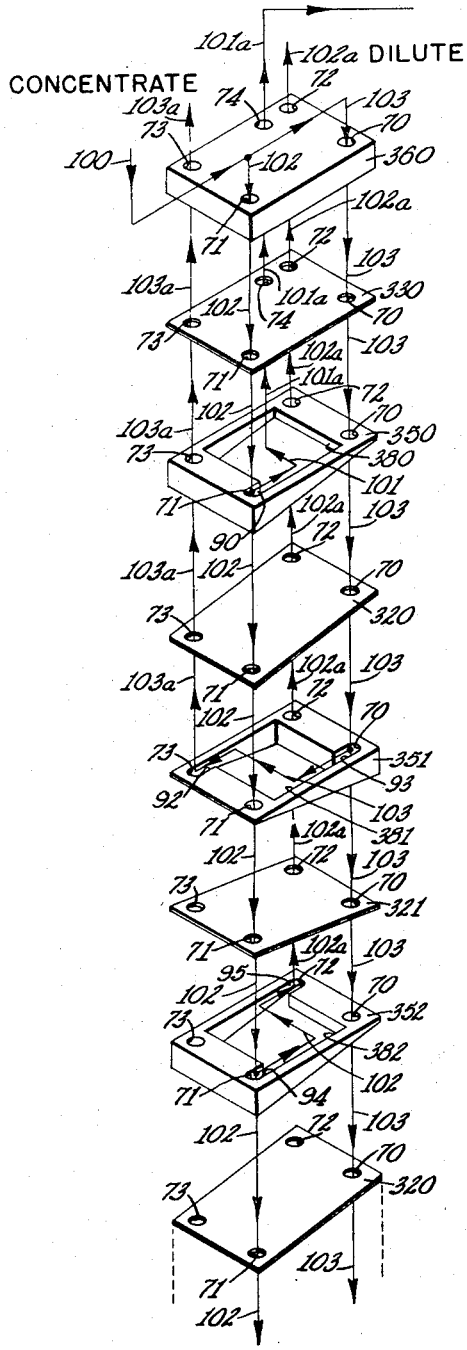
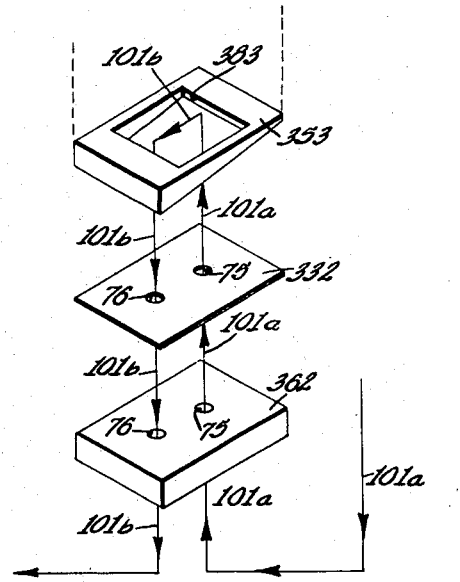
INVENTOR.
WILLIAM KWO-WEI CHEN
BY
William A. Drucker
ATTORNEY

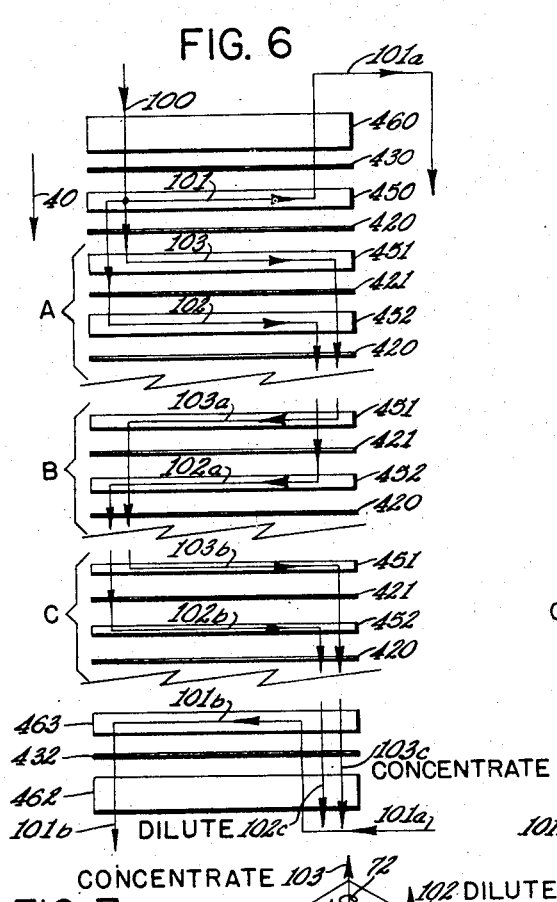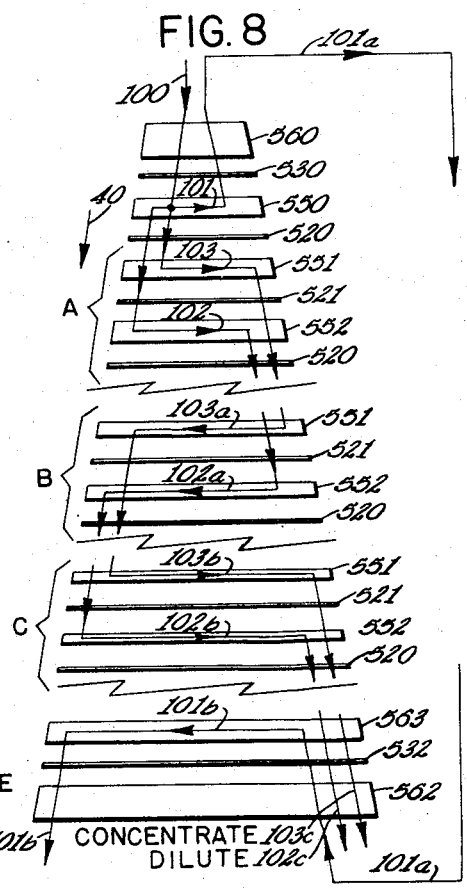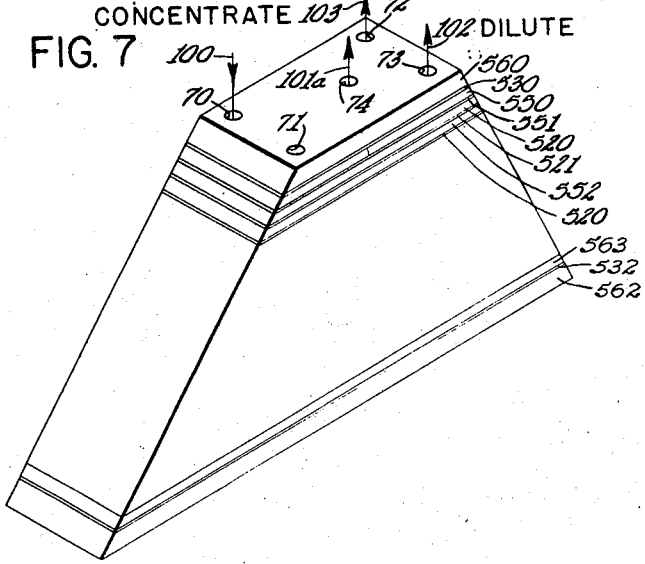

United States Patent Office 3,375,182
Patented Mar. 26, 1968

3,375,182
ELECTRODIALYSIS METHOD AND APPARATUS HAVING RADIALLY SYMMETRICAL FLOW PATHS
William Kwo-wei Chen, Stamford, Conn., assignor to American Machine & Foundry Company, a corporation of New Jersey
Original application Mar. 30, 1962, Ser. No. 195,352, now Patent No. 3,228,867, dated Jan. 11, 1966. Divided and this application July 19, 1965, Ser. No. 484,499
3 Claims. (Cl. 204—180)

This application is a divisional application of Ser. No. 195,352, filed Mar. 30, 1962, now U.S. Patent 3,228,867.

This invention relates to multiple chamber electrodialysis devices and methods of operation of these devices. More particularly, the invention relates to electrodialysis with permselecting membranes and to the hydraulic and electrical arrangement of such membranes in electrodialysis devices.

In the operation of multicell electrodialysis apparatus, concentration polarization and consequent water dissociation at the membrane surfaces due to electrolysis effects have been difficult practical problems. Concentration polarization results in lower current efficiency and also causes pH changes in the solutions undergoing electrodialysis. Such pH changes may also induce precipitation of pH sensitive salts such as calcium carbonate, which, in turn, would cause scaling of membranes and obstruction of flow channels. High linear velocity of solutions has been used to reduce this difficulty. However, substantial residence time of the solution in contact with the membrane surface is desirable to achieve an economical degree of demineralization.

Various designs and methods have been proposed to combine both prolonged contact of solutions with ion exchange material and rapid solution circulation. One approach has been to recirculate product streams with the attendant disadvantage of extra recirculation pumps, valves, storage tanks and control devices. This method is described in British Patent No. 682,703.

Another approach to minimizing concentration polarization has been the use of tortuous hydraulic channels through the intermembrane spacers as described in U.S. Patent No. 2,708,658. This complex spacer design generally results in the inefficient use of membrane surface areas and high pumping energy requirements, and since the flow through these tortuous channels is in series, plugging at any point in the flow path would seriously reduce the rate of flow. The high pressures required for the operation of such a system also require the use of very rigid membranes to prevent their distortion under unbalanced pressure conditions.

Another method of dealing with polarization problems has been proposed in U.S. Patent No. 2,694,680. A number of independent electrodialysis assemblies are arranged in a staggered system of stages to achieve incremental demineralization from stage to stage. Solution velocities and electric current flow are adjusted in each stage for greatest efficiency. However, the use of individual electrodes, different direct current voltages and separate packaging leads to engineering complications and expensive systems. For small electrodialysis systems in particular, where the flow rates are less than about two gallons per minute, it would be very impractical to provide separate end blocks, end plates, electrodes and interconnecting piping systems for each small group of cells. Separate electrode streams for each assembly would be especially impractical for low capacity systems because they require special handling.

Moreover, in Australian Patent No. 164,040 an electrodialysis process is described in which the stream to be demineralized is passed successively in series through every alternate compartment from one electrode to another to achieve a degree of demineralization higher than would result from parallel rather than series flow. The maximum electrical current that can be used in an electrodialysis cell without excessive concentration polarization is proportional to the concentration of electrolytes in the cell. In a series stack the limiting current through the stack is therefore governed by the concentration in the last product cell. This requirement automatically implies that the current flowing through the preceding product cells is lower than the maximum current which may be applied to these cells, and the process results in the uneconomical use of these cells. Since all compartments are in series, high hydraulic pressure requirements are also encountered at desirable solution velocities.

Therefore, it is an object of this invention to provide a method of electrodialysis which controls concentration polarization effects.

It is also an object of this invention to provide an electrodialysis device which incorporates means for producing high solution velocities in the sections of an electrodialysis device where such high velocities are required to reduce concentration polarization while maintaining lower solution velocities where maximum residence time (for higher degrees of demineralization) and minimum hydraulic pressure drops are desired.

It is also an object of this invention to provide a multicell electrodialysis device which produces the desired gradation in solution velocity and reduces concentration polarization by incorporating a series of cascaded membrane cells between a single electrode pair so that the cross sectional area in succeeding cascades progressively decreases in the direction of flow.

It is also an object of this invention to provide a method of electrodialysis by which a solution can be demineralized with a minimum expenditure of hydraulic pumping energy and a minimum degree of polarization between a single pair of electrodes.

It is also an object of this invention to provide a method of fluid demineralization in a multicompartment electrodialysis device characterized by the step of establishing a solution velocity gradient in inverse relation to the solution salinity gradient at constant current density between a single pair of electrodes.

It is also an object of this invention to provide a method of fluid demineralization in a multicompartment electrodialysis device characterized by the step of establishing between a single pair of electrodes a current density gradient in direct relation to a solution salinity gradient at constant solution velocity.

It is also an object of this invention to provide a method of fluid demineralization in a multicompartment electrodialysis device characterized by the step of establishing between a single pair of electrodes a graduated membrane area increasing in size in the direction of fluid flow.

These and other objects of the invention are described in the following detailed account of the invention and in the attached drawing in which reference characters of similar elements correspond and in which:

FIG. 2 is an exploded isometric view of the electrodialysis stack shown schematically in FIG. 1;

FIG. 4 is an exploded isometric view of another form of the invention, an electrodialysis stack employing membranes and intermembrane gaskets of hexagonal cross-section and utilizing a radial flow pattern;

FIG. 5 is an exploded isometric view of an electrodialysis stack employing wedge-shaped intermembrane gaskets, another form of the invention;

FIG. 6 is a schematic cross-section of an electrodialysis stack employing intermembrane gaskets of varying thicknesses, another form of the invention;

FIG. 7 is an isometric view of an assembled electrodialysis stack employing membranes and intermembrane gaskets of varying cross-sectional areas, another form of the invention;

FIG. 8 is a schematic cross-section of the electrodialysis stack shown in FIG. 7.

In general the various embodiments of the invention include a method of electrodialysis in which the velocity of liquid or the density of electric current flowing through an electrodialysis stack is adjusted along the solution flow path in relation to polarizing conditions established by a salinity gradient between the electrodes in the electrodialysis stack configurations in which these methods may be applied.

When raw feed solution enters the electrodialysis device, it is divided into two main parts. The first part becomes the "product" or dilute stream and the second part becomes the "waste" or concentrate stream. These descriptions apply when dilution rather than concentration is the desired effect.

As the dilute stream becomes more dilute in the course of flow through the device, a salinity gradient is established between the beginning and end of the dilute flow. Near the end of the dilute flow, as the stream is about to emerge from the device as a demineralized "product," the solution is no longer so good an electrical conductor as in its initial concentrated form. Polarization, or water dissociation at the membrane surfaces, as a result of too dilute (and therefore poorly conducting) a layer forming at the interfaces becomes particularly acute as the ratio of current density to salinity increases.

Increased solution velocity in relation to the decrease of salinity tends to overcome polarization, and the method of achieving velocity control is a first feature of this invention.

By decreasing the current density in particular parts of the device where the salinity has decreased, the ratio of current density to salinity is reduced and polarization is controlled. Reducing the current density as the salinity declines tends to maintain an optimum ratio of current density to salinity and controls polarization. Reduction of current density as salinity declines is a second feature of this invention.

Both control of fluid flow velocity and change of current density may be used separately or together in the same device in the practice of this invention, but for simplicity they are illustrated separately herein since both contribute to control of the same polarization effect.

Figure 1:
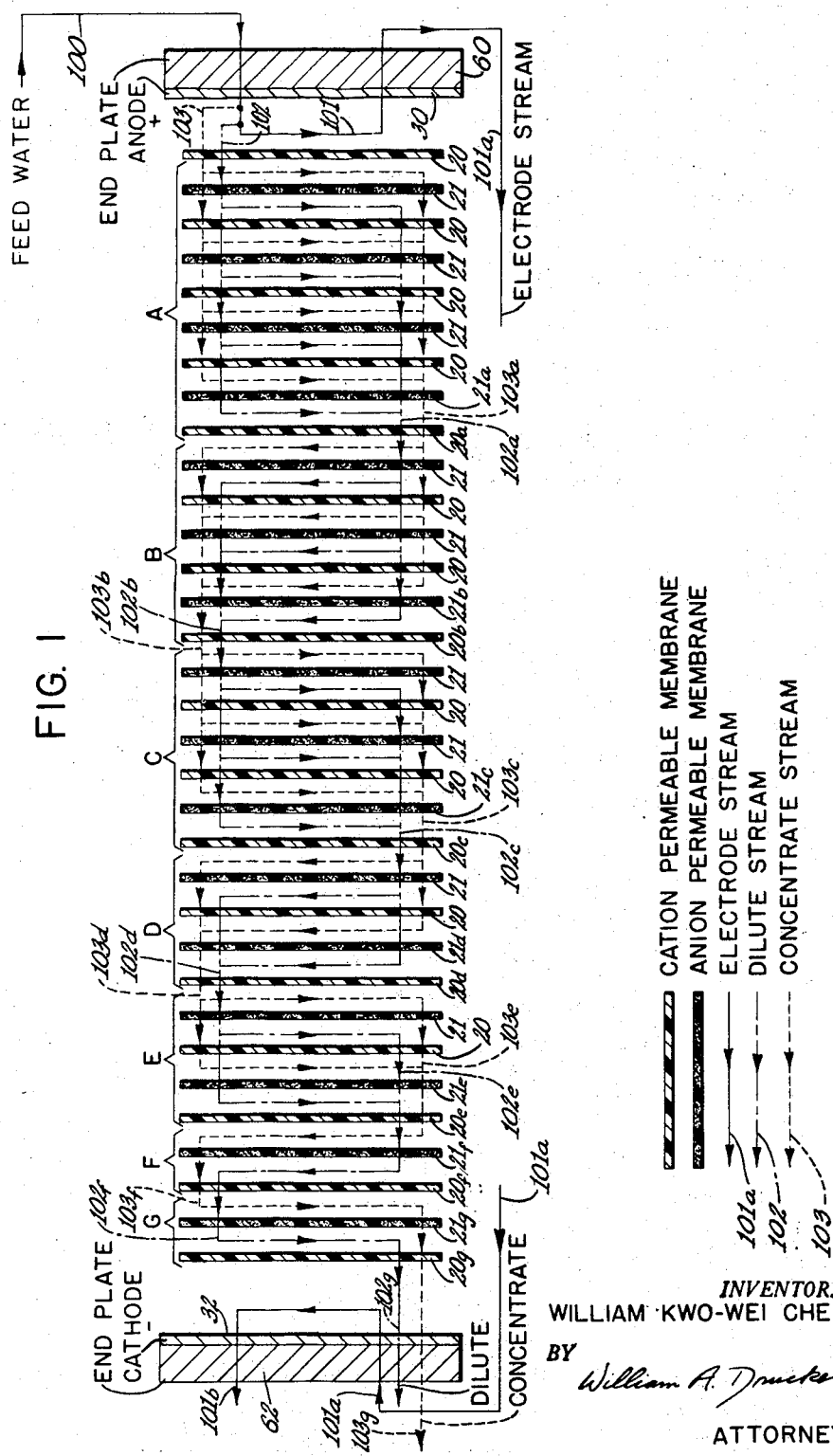
FIG. 1 is a schematic cross-section of an electrodialysis stack, the preferred form of the invention, showing alternate anion and cation permeable membranes arranged to form diluting and concentrating cells. The liquid flow patterns or hydraulic circuits are depicted by lines with arrows.

According to a preferred form of this invention, as shown in FIG. 1, solution residence time is controlled by connecting groups of cells or cascades hydraulically in series between a single set of electrodes 30, 32. By using a single electrode pair, a saving is made in the cost of supplying multiple electrodes, and the power losses associated with electrode over-voltage are reduced.

Each hydraulic pass at right angles to the direction of electrical current as indicated by the arrow 40 becomes an electrical cascade, and the change in concentration per cascade is proportional to the number of diluting cells or chambers per cascade.

Thus, in FIG. 1 and FIG. 2, the first cascade A containing four diluting cells (a diluting cell is formed within a stack when it is bounded by an anion membrane on the anode side and a cation membrane on the cathode side) will have a dilute stream solution velocity only ¾ that of the second cascade B with only three diluting cells.

Since the change in concentration in each cell is proportional to the electric current (which is constant in this case, and inversely proportional to the flow rate in the cell, it is seen that the first cascade A will undergo 4/3 the change in concentration of the second cascade B. Since all the cells are electrically in series, the average current density, CD, in all cells will be the same. In the diluting cells, however, the average electrolyte concentration will be progressively lower in each succeeding cascade. The ratio of current density to solution normality, $CD/N$, is an indication of polarizing conditions and will increase from the first cascade A to the seventh cascade G. In FIG. 1, cascades A, B, C, D, E, F, G contain 4, 3, 3, 2, 2, 1, 1 cells respectively.

Since higher $CD/N$ ratios are tolerable at higher solution velocities successive electrical cascades comprise a progressively reduced number of diluting cells in parallel. This type of membrane stack configuration or array thereby facilitates the use of designs in which the flow rates through different cells are optimized for the electrochemical conditions which exist therein.

FIG. 2 is an exploded isometric view of the electrodialysis stack in FIG. 1 showing the components used in the preferred form of the invention and the methods used to direct the various streams through the components. The principal components are end blocks 60, 62, electrodes 30, 32, intermembrane gaskets 50, 51, 52, 53 and membranes 20, 21, 20A, 21A. A clamping device, used to hold these components in liquid-tight relationship, is not shown.

In operation the solution to be demineralized is fed as a single stream 100 to a manifold hole 70 which is formed by the alignment of symmetrical holes 70 in the various components comprising the stack. An intermembrane gasket 50 serves both to define a flow path 80 for the anode rinsing stream and to split the feed stream 100 into three auxiliary streams 101, 102, 103. The three-way split is achieved by slits 90, 91 in a gasket 50 which communicates with the flow path 80 in the intermembrane gasket 50 and manifold hole 71. The function of the anolyte stream 101 is to collect and carry away the products of electrolysis at the anode 30. Where this stream leaves the stack, it is given the designation 101A in the drawing to denote its change in composition.

The dilute stream 102 undergoes dilution in respect to the solute during electrodialysis, it is distributed from a manifold 71 via slits 94 to the alternately arrayed intermembrane gaskets 52. Where this stream leaves the flow paths 82 in the gaskets 52 via slits 95, it is designated 102A in the drawing to denote the change in composition due to electrodialysis. In subsequent cascades this stream is designated 102B, 102C, 102D, etc. in the drawing to denote progressive additional changes in composition.

The concentrate stream 103 undergoes concentration in respect to the solute during electrodialysis. It is distributed from a manifold 70 to the alternately arrayed intermembrane gaskets 51 via slits 93. Where this stream leaves the flow paths 81 in intermembrane gaskets 51 via slits 93, it is designated 103A in the drawing to denote the change in composition due to electrodialysis. In subsequent cascades this stream is designated 103B, 103C, 103D, etc. in the drawing to denote progressive additional changes in composition.

When the first electrode 30 is an anode and the second electrode 32 is a cathode, the first and alternate membranes 20 are cation permselective membranes and the intervening membranes 21 are anion permselective membranes. In the last parallel pass of each cascade (denoted in FIG. 2 as the $n$th pass of a cascade having $n$ parallel passes) membranes 21A, 20A containing only three holes each are used in place of the anion and cation membranes 21, 20. Hydraulic blocks 70, 71 are thereby created at the inlet stream manifolds. The delute stream effluents 102A from cascade A are thus recombined in the dilute stream manifold hole 72 and are redistributed through the alternately arrayed gaskets 52 in cascade B. Since cascade B contains fewer parallel passes and a smaller total cross-sectional flow path for the dilute stream 102A than does cascade A, the average linear solution velocity will be greater in cascade B. It should also be noted that the direction of flow of the dilute stream is reversed by this process.

The concentrate stream effluents 103A are similarly recombined in the concentrate stream manifold hole 73 and are redistributed through the alternately arrayed gaskets 51 in cascade B. Since cascade B contains fewer parallel passes for the concentrate stream 103A than does cascade A, the average linear solution velocity will be greater in cascade B.

In the case of the concentrate stream progressively increasing solution velocity is not an essential feature. It is shown only for the sake of symmetry as an aid in the description of a cascaded structure. Similarly, the internal development of several process streams 101, 102, 103 from a single feed stream is not essential to the practice of this invention but shows the preferred method of construction.

The anolyte stream 101A flowing out of the top of the stack through holes 74 in the anode and end block respectively is utilized again at the bottom of the stack where it is directed through holes 75 in the end block 62 and cathode 32 respectively into the flow path 83 of the intermembrane gasket 53. Since the intermembrane gasket 53 has no slits communicating with the manifold holes 70, 71, 72, 73, the catholyte stream 101A is isolated from the dilute and concentrate streams and leaves the stack through holes 76 in the cathode and end block respectively as stream 101B. Alternately, raw feed solution from stream 100, the concentrate stream effluent 103G or a portion of the dilute stream effluent 102G could be used for the cathode wash stream 101A–B.

Figure 3:
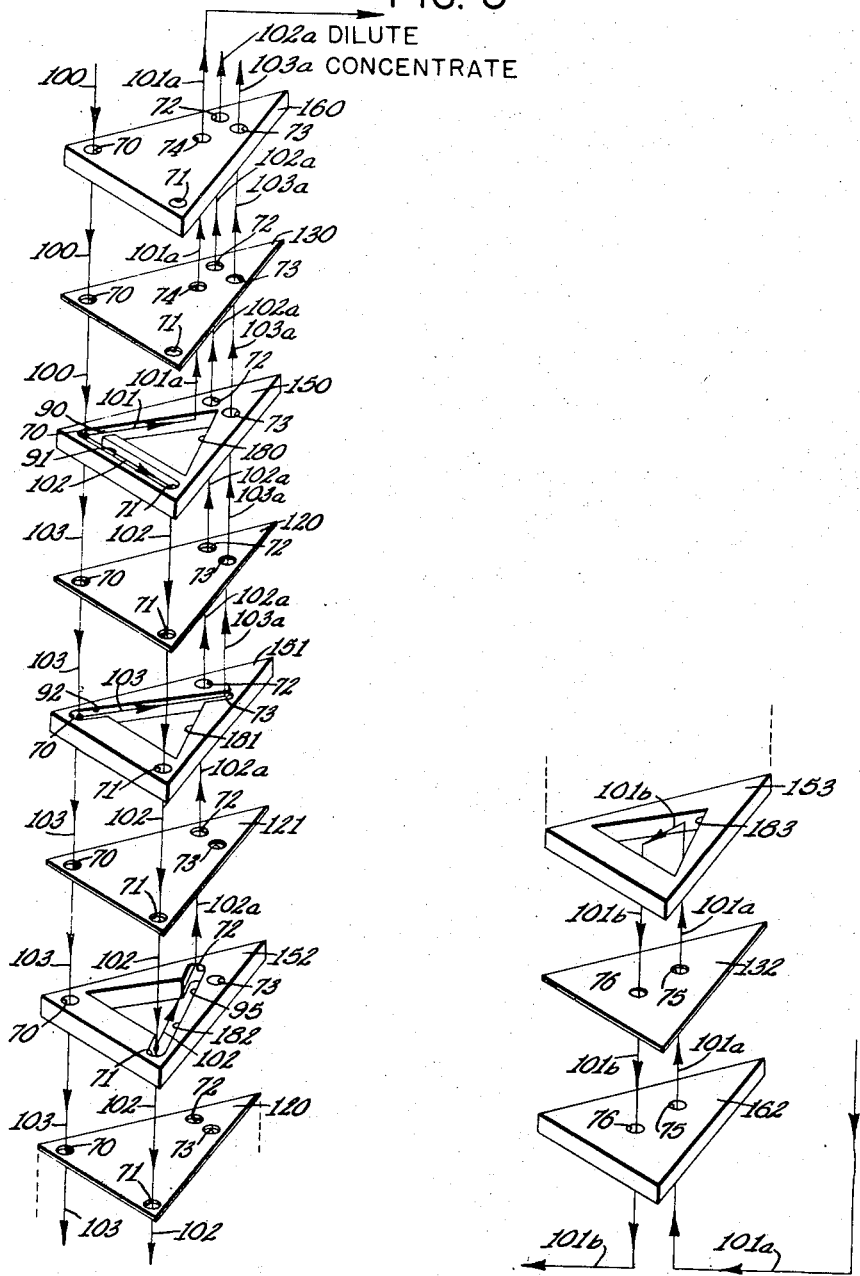
FIG. 3 is an exploded isometric view of a modified form of the invention, an electrodialysis stack employing membranes and intermembrane gaskets having a triangular cross-section.

FIG. 3 is an exploded isometric view of another embodiment of this invention in which the end blocks 160, 162, electrodes 130, 132, the intermembrane gaskets 150, 151, 152, 153 and membranes 120, 121 are all of triangular shape. A clamping device, used to hold these components in liquid-tight relationship, is not shown.

In operation the solution to be demineralized is fed as a single stream 100 to the manifold hole 70 at the base of the triangle which is formed by the alignment of symmetrical holes 70 in the various components comprising the stack.

The intermembrane gasket 150 serves both to define a flow path 180 for the anode rinsing stream and to split the feed stream 100 into three auxiliary streams 101, 102, 103. The three-way split is achieved through the use of slits 90, 91 in the intermembrane gasket 150 which communicate with the flow path 180 in the intermembrane gasket 150 and the dilute inlet manifold hole 71. The anode rinse stream 101 is called the anolyte. Its function is to collect and carry away the products of electrolysis at the anode 130. Where this stream leaves the stack, it is given the designation 101A to denote its change in composition.

The dilute stream 102 is distributed from the dilute stream manifold 71 via slits 94 to the alternately arrayed intermembrane gaskets 152 and is electrodialyzed in the same manner as that described for FIG. 1. In this case, however, all intermembrane gaskets 152 are connected hydraulically in parallel, and the desired increase in solution velocity along the salinity gradient and desalination flow path 182 is achieved by the progressively decreasing cross-sectional flow area in the flow path.

The concentrate stream 103 is distributed from the concentrate stream manifold 70 via slits 92 to the alternately arrayed intermembrane gaskets 151 and undergoes electrodialytic concentration along its flow paths 181. Parallel construction and parallel flow of the concentrate stream is illustrated for simplicity but is not essential for the operation of the apparatus.

The electrode rinse stream 101–101A–101B flows in series through the anolyte flow path 180 and the catholyte flow path 183 in a manner similar to that described for FIG. 2.

Solution entering at the base of the triangle flows toward the apex. Thus, the flow path becomes constricted as solution flows toward the triangle apex, and velocity increases. The increase in velocity corresponds with a decrease in solution salinity. Decreased salinity is usually conducive to polarization problems, whereas increased velocity of flow has a correcting effect. As the polarization conditions become more acute, they are compensated by higher flow rates. The triangular flow path has been chosen as representative of the principle of this embodiment, but other flow path cross-sections such as trapezoids would serve as well, provided only that the solution is forced to increase its velocity progressively along the direction of flow.

FIG. 4 is an exploded isometric view of another embodiment of this invention in which end blocks 260, 262, electrodes 230, 232, intermembrane gaskets 250, 251, 252, 253 and membranes 220, 221 are all of hexagonal shape. A clamping device, used to hold these components in liquid-tight relationship, is not shown.

The functions of the various components are identical with corresponding components shown in FIG. 3. In this case, however, the desired increase in solution velocity along the desalination flow path 282 is achieved by radial flow of the dilute stream 102 from the multiple dilute stream inlet manifolds 70 located in the periphery of the intermembrane gaskets 252 toward the dilute stream outlet manifold 72 located in or near the center of the intermembrane gaskets 252. Solution velocity increases as the liquid moves to the more constricted central flow path.

The concentrate stream 103 is similarly manifolded in alternately arrayed gaskets 251, but this construction feature is not essential to the operation of apparatus.

The hexagonal shape of the various stack components has been chosen for simplified illustration. Other polygonal, circular or elliptical shapes having a radial symmetry would serve as well, provided only that the flow is directed from the periphery toward the center or core of the diluting compartments.

FIG. 5 is an exploded isometric view of another embodiment of this invention in which intermembrane gaskets 350, 351, 352, 353 are wedge-shaped and so oriented in respect to one another that their complete assembly constitutes a right prismatic stack.

The dilute stream 102 is directed through flow path 382 in gaskets 352 so that the decrease in cross-sectional area in the gasket imparts a progressively increasing solution velocity along the desalination flow path.

In FIG. 5 the concentrate stream 103 originates outside the stack from the feed stream 100 and is directed separately into the concentrate stream manifold 70. The concentrate stream thus flows countercurrent to the dilute stream and is also subjected to progressively increasing velocity. Countercurrent flow of the concentrate stream is not essential to the practice of this invention, however, and has been illustrated only to show its method of application to the invention.

FIG. 6 is a schematic cross-sectional view of an electrodialysis stack depicting another embodiment of this invention in which the intermembrane gaskets 451, 452 have progressively reduced thicknesses in each of the successive electrical cascades A, B, C. The dilute stream 102 flowing in series through each cascade is thereby forced to increased linear velocity along the desalination flow path. The concentrate stream 103 is similarly affected by the configuration shown in FIG. 6, but this feature is not essential to the practice of the invention. The function of all other corresponding stack components is essentially the same as that described for FIG. 2.

FIG. 7 is an isometric view of an assembled electrodialysis stack showing another embodiment of this invention in which the intermembrane gaskets 551, 552 have progressively larger areas in each of the successive electrical cascades A, B, C.

The dilute stream 102 and concentrate stream 103 flow paths through this stack are illustrated by reference to the schematic cross-section shown in FIG. 8. Although the dilute stream 102 solution velocity does not change throughout the stack array, the total electrical current flow 40 is distributed over a progressively larger area in the same general direction that the dilute stream 102 follows.

The current density (total current divided by the area through which it flows) is progressively, although not necessarily linearly, reduced along the desalination flow path and achieves the same depolarizing effect as that realized by increasing solution velocity at constant current density.

The concentrate stream 103 is shown in parallel and concurrent flow relative to the dilute stream 102, but this feature is not essential to the application of the invention. All other stack components have functions similar to those described for FIG. 2.

*Example I*

An electrodialysis stack constructed as shown in FIGS. 1 and 2 comprised seventeen cation membranes, sixteen anion membranes, sixteen diluting compartments, sixteen concentrating compartments, one anolyte compartment and one catholyte compartment. The diluting and concentrating compartments arranged in cascades from A to G comprised 4, 3, 3, 2, 2, 1 and 1 compartment each respectively. Each intermembrane gasket was five centimeters wide by thirty-eight centimeters long by one-tenth centimeter thick and had a flow path area two and one-half centimeters by thirty and one-half centimeters (seventy-six square centimeters). A turbulence promoting screen similar to that shown in U.S. Patent No. 1,972,433 was located within the flow path of each gasket.

At a pressure of 700 grams per square centimeter and a total flow rate of 5 ml./sec. to the stack, the flow rates to each stream were distributed as follows:

| | Ml./sec. |
|---|---|
| Dilute stream | 2 |
| Concentrate stream | 2 |
| Electrode streams (in series) | 1 |

When the composition of the feed solution was adjusted to 3,000 parts per million of sodium chloride at pH 7 and a direct current potential of 18 volts applied, a steady state current of 0.55 ampere was observed. Under these conditions the product water (dilute stream) contained 450 parts per million of sodium chloride and its pH was 6.7. Thus a high degree of demineralization was achieved with control of polarization.

Since slight pH changes normally occur during electrodialysis, the exact pH change at which polarization is considered undesirable is not critical. A change in pH of about three units in the range of pH 7, however, would be considered unacceptable, whereas a pH change of about 0.5 unit would be satisfactory in most cases.

*Example II*

An electrodialysis stack was constructed with the components used in Example I and comprised sixteen diluting compartments in series, sixteen concentrating compartments in series, one anolyte compartment and one catholyte compartment. At a pressure of 4.2 kilograms per square centimeter and a total flow rate of 5 ml./sec., the flow rates to each stream were distributed as follows:

| | Ml./sec. |
|---|---|
| Dilute stream | 2 |
| Concentrate stream | 2 |
| Electrode streams (in series) | 1 |

When the composition of the feed solution was adjusted to 3,000 parts per million of sodium chloride at pH 7 and a direct current potential of 15 volts applied, a steady state current of 0.55 ampere was observed. Under these conditions the product water (dilute stream) contained 470 parts per million of sodium chloride and the pH was 6.6.

Thus it is seen that a considerably higher pressure is required with all the cells in series to achieve the same degree of demineralization as that achieved in Example I.

After an overnight operation under the above described conditions, it was found that this excessively high pressure caused leakage and ultimate failure of the system.

There have thus been described methods and apparatus for electrodialysis in which the velocity of liquid and the density of electric current flowing through an electrodialysis system are adjusted along the solution flow path in relation to polarization conditions and in particular in relation to the salinity gradient in the stacked membrane and gasket array, and the ratio of current density to salinity is controlled.

What is claimed is:

1. A method of fluid demineralization in a multi-compartment electrodialysis device characterized by the steps of flowing a solution in radially symmetrical flow paths defined by a plurality of membrane gaskets spaced alternately between membranes to form concentrating and diluting chambers, said flow paths commencing in a plurality of source inlets located in the outer periphery of said flow paths and moving toward a constricted central flow path wherein there is established a solution velocity gradient in inverse relationship to a solution salinity gradient at constant applied voltage between a pair of electrodes while demineralizing said solution and separating the central constricted flow path into product and concentrate streams.

2. A method of fluid demineralization in a multi-compartment electrodialysis system characterized by the steps of flowing a solution in radially symmetrical flow paths defined by a plurality of membrane gaskets spaced alternately between membranes to form concentrating and diluting chambers, said flow paths commencing in a plurality of source inlets located in the outer periphery of said flow paths and moving toward a constricted central flow path wherein there is established a solution velocity gradient in inverse relationship to solution salinity gradient at constant applied voltage while demineralizing said solution and separating the constricted central flow path into product and concentrate streams.

3. A multi-compartment electrodialysis device comprising a pair of electrodes, means for imposing a direct current between said electrodes, a plurality of permselective membranes arranged between said electrodes, a plurality of radially symmetrical membrane gaskets forming concentrating and diluting chambers between said membranes, said gaskets provided with means for flowing a solution from the periphery toward the center of the plane in which said gaskets are disposed, fluid flow inlet and outlet means for said chambers, conduit means connecting said chambers, said gaskets defining a radial flow path for solution entering said chambers and a constricted central flow path for solution leaving said chambers.

References Cited

UNITED STATES PATENTS

| Re. 25,265 | 10/1962 | Kollsman | 204—301 |
| 2,686,154 | 10/1954 | MacNeil | 204—301 |
| 2,694,680 | 11/1954 | Katz et al. | 204—301 |
| 3,005,763 | 10/1961 | Kollsman | 204—301 |

FOREIGN PATENTS 759,275  10/1956  Great Britain.

HOWARD S. WILLIAMS, *Primary Examiner.*

JOHN H. MACK, *Examiner.*

E. ZAGARELLA, *Assistant Examiner.*